United States Patent
Han et al.

(10) Patent No.: US 8,983,798 B2
(45) Date of Patent: Mar. 17, 2015

(54) DIAGNOSTIC SYSTEM AND METHOD FOR HOME APPLIANCE

(75) Inventors: Jonghye Han, Changwon-si (KR); Inhaeng Cho, Changwon-si (KR); Phaljin Lee, Changwon-si (KR); Hoijin Jeong, Changwon-si (KR)

(73) Assignee: LG Electronics Inc., Seoul (KR)

( * ) Notice: Subject to any disclaimer, the term of this patent is extended or adjusted under 35 U.S.C. 154(b) by 660 days.

(21) Appl. No.: 12/842,649

(22) Filed: Jul. 23, 2010

(65) Prior Publication Data

US 2011/0022358 A1    Jan. 27, 2011

(30) Foreign Application Priority Data

Jul. 24, 2009 (KR) .................. 10-2009-0067904

(51) Int. Cl.
  *G06F 11/30* (2006.01)
  *G05B 19/042* (2006.01)
(52) U.S. Cl.
  CPC .. *G05B 19/0428* (2013.01); *G05B 2219/24067* (2013.01); *G05B 2219/24084* (2013.01); *G05B 2219/2642* (2013.01)
  USPC ........................................................ 702/183
(58) Field of Classification Search
  CPC ............... G05B 19/0428; G05B 2219/2642; G05B 2219/24084; G05B 2219/24067
  USPC ..................... 702/183; 379/106.01
  See application file for complete search history.

(56) References Cited

U.S. PATENT DOCUMENTS

| | | | |
|---|---|---|---|
| 3,910,322 A | 10/1975 | Hardesty et al. |
| 4,146,754 A | 3/1979 | Rose |
| 4,766,505 A | 8/1988 | Nakano et al. |
| 4,797,656 A | 1/1989 | Keppler |
| 4,897,659 A | 1/1990 | Mellon |
| 4,897,857 A | 1/1990 | Wakatsuki et al. |
| 4,916,439 A | 4/1990 | Estes et al. |
| 4,977,394 A | 12/1990 | Manson et al. |
| 5,103,214 A | 4/1992 | Curran et al. |
| 5,210,784 A | 5/1993 | Wang et al. |
| 5,268,666 A | 12/1993 | Michel et al. |

(Continued)

FOREIGN PATENT DOCUMENTS

| | | |
|---|---|---|
| CN | 1212304 | 3/1999 |
| CN | 1343862 | 4/2002 |

(Continued)

OTHER PUBLICATIONS

International Search Report dated Dec. 18, 2009 issued in Application No. PCT/KR2009/002288.

(Continued)

*Primary Examiner* — Tung S Lau
*Assistant Examiner* — Xiuquin Sun
(74) *Attorney, Agent, or Firm* — KED & Associates, LLP

(57) ABSTRACT

A home appliance diagnostic system and method are disclosed. A home appliance outputs product information in the form of a sound signal, which is transmitted to a service center at a remote site over a communication network so that the service center can readily check the state of the home appliance. The home appliance performs a sound signal re-output operation in such a manner that it re-outputs the same product information in the form of a different sound signal. Therefore, it is possible to improve a sound recognition rate, so as to improve fault diagnosis accuracy.

7 Claims, 8 Drawing Sheets

(56) References Cited

U.S. PATENT DOCUMENTS

| | | | |
|---|---|---|---|
| 5,452,344 A | 9/1995 | Larson | |
| 5,506,892 A | 4/1996 | Kojima et al. | |
| 5,586,174 A | 12/1996 | Bogner et al. | |
| 5,664,218 A | 9/1997 | Kim et al. | |
| 5,757,643 A | 5/1998 | Kuroda et al. | |
| 5,774,529 A | 6/1998 | Johannsen et al. | |
| 5,864,828 A | 1/1999 | Atkins | |
| 5,939,992 A | 8/1999 | Devries et al. | |
| 5,940,915 A | 8/1999 | Nam | 8/159 |
| 5,987,105 A * | 11/1999 | Jenkins et al. | 379/106.01 |
| 6,121,593 A | 9/2000 | Mansbery et al. | |
| 6,157,313 A | 12/2000 | Emmermann | |
| 6,424,252 B1 | 7/2002 | Adler | |
| 6,727,814 B2 | 4/2004 | Saltzstein et al. | |
| 6,759,954 B1 | 7/2004 | Myron et al. | |
| 6,763,458 B1 | 7/2004 | Watanabe et al. | 713/100 |
| 6,778,868 B2 | 8/2004 | Imamura et al. | |
| 6,784,801 B2 | 8/2004 | Watanabe et al. | |
| 6,870,480 B2 | 3/2005 | Suzuki et al. | |
| 6,873,255 B2 | 3/2005 | Gallagher | |
| 6,906,617 B1 | 6/2005 | Van der Meulen | |
| 7,010,612 B1 | 3/2006 | Si et al. | |
| 7,135,982 B2 | 11/2006 | Lee | 340/635 |
| 7,243,174 B2 | 7/2007 | Sheahan et al. | |
| 7,266,164 B2 | 9/2007 | Jeon et al. | |
| 7,280,643 B2 | 10/2007 | Howard et al. | 379/93.37 |
| 7,337,457 B2 | 2/2008 | Pack et al. | 725/40 |
| 7,363,031 B1 | 4/2008 | Aisa | |
| 7,383,644 B2 | 6/2008 | Lyu et al. | |
| 7,439,439 B2 | 10/2008 | Hayes et al. | 84/600 |
| 7,509,824 B2 | 3/2009 | Park et al. | 68/12.23 |
| 7,558,700 B2 | 7/2009 | Yamashita et al. | |
| 7,574,269 B2 | 8/2009 | Cenedese et al. | |
| 7,631,063 B1 | 12/2009 | Ho et al. | |
| 7,648,476 B2 | 1/2010 | Bock et al. | |
| 7,653,512 B2 | 1/2010 | Cheung et al. | 702/184 |
| 7,750,227 B2 | 7/2010 | Hayes et al. | |
| 7,843,819 B1 | 11/2010 | Benveniste | |
| 7,965,632 B2 | 6/2011 | Sugaya | |
| 8,027,752 B2 | 9/2011 | Castaldo et al. | |
| 8,040,234 B2 | 10/2011 | Ebrom et al. | 340/531 |
| 8,045,636 B1 | 10/2011 | Lee et al. | |
| 8,132,049 B2 | 3/2012 | Yasukawa et al. | |
| 8,204,189 B2 | 6/2012 | Rhodes et al. | |
| 8,325,054 B2 | 12/2012 | Kim et al. | |
| 8,391,255 B2 | 3/2013 | Ribiere et al. | |
| 8,428,910 B2 | 4/2013 | Papadimitriou et al. | |
| 2002/0029575 A1 | 3/2002 | Okamoto | |
| 2002/0032491 A1 | 3/2002 | Imamura et al. | |
| 2002/0078742 A1 | 6/2002 | Kim | 73/162 |
| 2002/0097161 A1 | 7/2002 | Deeds | |
| 2002/0116959 A1 | 8/2002 | Ohta et al. | |
| 2002/0120728 A1 | 8/2002 | Braatz et al. | |
| 2003/0028345 A1 | 2/2003 | Watkins et al. | |
| 2003/0058101 A1 | 3/2003 | Watanabe et al. | |
| 2003/0110363 A1 | 6/2003 | Bachot et al. | |
| 2003/0128850 A1 | 7/2003 | Kimura et al. | |
| 2003/0144010 A1 | 7/2003 | Dollinger | |
| 2003/0167782 A1 | 9/2003 | Roh et al. | |
| 2003/0196492 A1 | 10/2003 | Remboski et al. | 73/593 |
| 2004/0032853 A1 | 2/2004 | D'Amico et al. | |
| 2004/0132444 A1 | 7/2004 | Herrmann | |
| 2004/0158333 A1 | 8/2004 | Ha et al. | |
| 2004/0211228 A1 | 10/2004 | Nishio et al. | |
| 2004/0249903 A1 | 12/2004 | Ha et al. | |
| 2004/0261468 A1 | 12/2004 | Lueckenbach | |
| 2005/0015890 A1 | 1/2005 | Kim et al. | |
| 2005/0028034 A1 | 2/2005 | Gantman et al. | |
| 2005/0029976 A1 | 2/2005 | Terry et al. | |
| 2005/0086979 A1 | 4/2005 | Son et al. | |
| 2005/0129200 A1 | 6/2005 | Forrest et al. | 379/93.37 |
| 2005/0134472 A1 | 6/2005 | Jang et al. | |
| 2005/0162909 A1 | 7/2005 | Wooldridge | |
| 2005/0222859 A1 | 10/2005 | Ha | |
| 2006/0048405 A1 | 3/2006 | Baek et al. | |
| 2006/0066758 A1 | 3/2006 | Higashihara | |
| 2006/0089818 A1 | 4/2006 | Norell et al. | |
| 2006/0136544 A1 | 6/2006 | Atsmon et al. | |
| 2006/0168740 A1 | 8/2006 | Ha et al. | |
| 2006/0259199 A1 | 11/2006 | Gjerde et al. | |
| 2007/0113595 A1 | 5/2007 | Harwood et al. | |
| 2007/0137265 A1 | 6/2007 | Shikamori et al. | |
| 2007/0175883 A1 | 8/2007 | Miu et al. | |
| 2007/0189323 A1 | 8/2007 | Swoboda et al. | |
| 2007/0219756 A1 | 9/2007 | Frankel et al. | |
| 2007/0272286 A1 | 11/2007 | Curtius et al. | |
| 2008/0036619 A1 | 2/2008 | Rhodes et al. | |
| 2008/0072383 A1 | 3/2008 | Bextermoller et al. | |
| 2008/0122648 A1 | 5/2008 | Ebrom et al. | |
| 2008/0181058 A1 | 7/2008 | Hayakawa | |
| 2009/0036778 A1 | 2/2009 | Cohen et al. | |
| 2009/0067102 A1 | 3/2009 | Cline et al. | |
| 2009/0160637 A1 | 6/2009 | Maeng | |
| 2009/0169434 A1 | 7/2009 | Ogusu | |
| 2009/0282308 A1 | 11/2009 | Gutsche et al. | |
| 2009/0323914 A1 | 12/2009 | Lee et al. | |
| 2010/0023938 A1 | 1/2010 | Lee et al. | |
| 2010/0027770 A1 | 2/2010 | Park et al. | |
| 2010/0037401 A1 | 2/2010 | Bae et al. | |
| 2010/0116060 A1 | 5/2010 | Murayama | 73/593 |
| 2010/0318324 A1 | 12/2010 | Kim et al. | |
| 2011/0022358 A1 | 1/2011 | Han et al. | |
| 2011/0060553 A1 | 3/2011 | Han et al. | |
| 2011/0074589 A1 | 3/2011 | Han et al. | |
| 2011/0200189 A1 | 8/2011 | True et al. | |

FOREIGN PATENT DOCUMENTS

| | | |
|---|---|---|
| CN | 1393672 | 1/2003 |
| CN | 1409886 | 4/2003 |
| CN | 1424843 | 6/2003 |
| CN | 1497915 | 5/2004 |
| CN | 1606282 | 4/2005 |
| CN | 1690685 | 11/2005 |
| CN | 2797999 | 7/2006 |
| CN | 101202639 | 6/2008 |
| CN | 101447119 | 6/2009 |
| CN | 101680693 | 3/2010 |
| CN | 102017520 | 4/2011 |
| EP | 0 038 687 | 10/1981 |
| EP | 0 510 519 A1 | 10/1992 |
| EP | 0 617 557 A2 | 9/1994 |
| EP | 0 691 060 B1 | 1/1996 |
| EP | 0 742 308 | 11/1996 |
| EP | 0 846 991 | 6/1998 |
| EP | 0 851 054 | 7/1998 |
| EP | 0 887 989 | 12/1998 |
| EP | 1 186 694 | 3/2002 |
| EP | 1 186 695 | 3/2002 |
| EP | 2 180 648 | 4/2010 |
| JP | 04-241563 | 8/1992 |
| JP | 04-358497 | 12/1992 |
| JP | 4-358497 A | 12/1992 |
| JP | 07-239176 | 9/1995 |
| JP | 10-133767 | 5/1998 |
| JP | 11-127254 | 5/1999 |
| JP | 11-127254 | 11/1999 |
| JP | 2001-345949 | 12/2001 |
| JP | 2001-353395 A | 12/2001 |
| JP | 2002-000988 A | 1/2002 |
| JP | 2002-011274 A | 1/2002 |
| JP | 2002-031471 | 1/2002 |
| JP | 2002-045590 A | 2/2002 |
| JP | 2002-85887 | 3/2002 |
| JP | 2002-162149 | 6/2002 |
| JP | 2002-279091 | 9/2002 |
| JP | 2003-172578 | 6/2003 |
| JP | 2004-085071 | 3/2004 |
| JP | 2004-215125 | 7/2004 |
| JP | 2005-061757 | 3/2005 |
| JP | 2005-273943 | 10/2005 |
| JP | 2007-267956 A | 10/2007 |
| JP | 2008-003562 A | 1/2008 |
| KR | 10-1991-0020404 A | 12/1991 |

(56) References Cited

FOREIGN PATENT DOCUMENTS

| KR | 10-1996-003308 A | 1/1996 |
|---|---|---|
| KR | 10-1996-0003308 A | 1/1996 |
| KR | 10-1997-0019443 A | 4/1997 |
| KR | 10-0127232 B1 | 10/1997 |
| KR | 10-0143209 | 8/1998 |
| KR | 10-1999-020285 | 3/1999 |
| KR | 20-1999-0040564 U | 12/1999 |
| KR | 20-0162050 | 12/1999 |
| KR | 10-2000-0018678 A | 4/2000 |
| KR | 10-2001-0063913 A | 5/2001 |
| KR | 10-2001-0055394 A | 7/2001 |
| KR | 10-2002-0020831 A | 3/2002 |
| KR | 10-2002-0030426 A | 4/2002 |
| KR | 10-2002-0039959 | 5/2002 |
| KR | 10-2003-0000189 | 1/2003 |
| KR | 10-0389690 B1 | 6/2003 |
| KR | 10-0406094 B1 | 11/2003 |
| KR | 10-2004-0050767 | 6/2004 |
| KR | 10-2004-0095017 | 11/2004 |
| KR | 10-2004-0103352 | 12/2004 |
| KR | 10-2005-0062747 A | 6/2005 |
| KR | 10-2005-0097282 A | 10/2005 |
| KR | 10-0564761 B1 | 3/2006 |
| KR | 10-2006-0056973 | 5/2006 |
| KR | 10-2006-0103014 | 9/2006 |
| KR | 10-0641974 | 11/2006 |
| KR | 10-2007-0013090 A | 1/2007 |
| KR | 10-2008-0068447 | 7/2008 |
| KR | 10-0887575 | 3/2009 |
| KR | 10-2009-0115066 | 11/2009 |
| KR | 10-2010-0112950 | 10/2010 |
| KR | 10-2011-0010375 | 2/2011 |
| KR | 10-2011-0010378 | 2/2011 |
| WO | WO 01/11575 | 2/2001 |
| WO | WO 2005/106096 | 11/2005 |
| WO | WO 2008/010670 | 1/2008 |
| WO | WO 2008/117981 | 10/2008 |
| WO | WO 2009/134090 | 11/2009 |

OTHER PUBLICATIONS

International Search Report dated Dec. 21, 2009 issued in Application No. PCT/KR2009/002199.
International Search Report dated Jan. 4, 2010 issued in Application No. PCT/KR2009/002211.
PCT International Search Report dated Aug. 23, 2010 issued in Application No. PCT/KR2010/000319.
International Search Report dated Dec. 1, 2010 (PCT/KR2010/002211).
International Search Report dated Dec. 1, 2010 (PCT/KR2010/002222).
U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
U.S. Notice of Allowance issued in U.S. Appl. No. 12/847,303 dated Jan. 11, 2013.
U.S. Office Action issued in U.S. Appl. No. 12/431,903 dated Jan. 2, 2013.
U.S. Office Action issued in U.S. Appl. No. 12/757,246 dated Jan. 17, 2013.
U.S. Office Action issued in U.S. Appl. No. 12/431,893 dated Jan. 29, 2013.
PCT International Search Report dated May 26, 2011 issued in Application No. PCT/KR2010/005108.
International Search Report dated Apr. 25, 2011 issued in Application No. PCT/KR 2010/004407.
United States Office Action dated Dec. 27, 2011 issued in U.S. Appl. No. 12/432,184.
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
U.S. Office Action issued in U.S. Appl. No. 12/432,111 dated May 2, 2012.
European Search Report dated May 8, 2012.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
International Search Report issued in Application No. PCT/KR2011/000311 dated Jul. 28, 2011.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Russian Office Action issued in Application No. 2010144513/08 dated Jun. 27, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
Korean Office Action dated Aug. 13, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).
European Search Report dated Oct. 14, 2011 issued in Application No. 09 73 8950.
Chinese Office Action dated Jun. 27, 2013.

(56) References Cited

OTHER PUBLICATIONS

U.S. Office Action issued in U.S. Appl. No. 12/431,893 dated Jul. 30, 2013.
U.S. Office Action issued in U.S. Appl. No. 12/757,339 dated Sep. 6, 2013.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
European Search Report dated Dec. 17, 2012.
European Search Report dated Jan. 2, 2013.
Ethem M Sözer; "Simulation and Rapid Prototyping Environment for Underwater Acoustic Communications: Reconfigurable Modem"; Oceans-Europe 2005; MIT Sea Grant College Program; Cambridge, MA, 02139; IEEE; pp. 80-85 (XP10838461A).
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
Japanese Office Action dated Oct. 29, 2013.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.
Korean Notice of Allowance dated Aug. 30, 2013.
Chinese Office Action dated Oct. 10, 2013. (416610).
Chinese Office Action dated Oct. 10, 2013. (419110).
U.S. Notice of Allowance issued in U.S. Appl. No. 12/846,013 dated Nov. 5, 2013.
Korean Office Action dated Feb. 26, 2014.
Korean Office Action dated Feb. 28, 2014.
Chinese Office Action dated Mar. 4, 2014.
Chinese Office Action dated Mar. 5, 2014.
Chinese Office Action dated Dec. 16, 2013.(translation).
European Office Action dated Jan. 7, 2014. (11803799.3).
European Office Action dated Jan. 7, 2014. (11803798.5).
Australian Office Action dated Jan. 13, 2014.
Korean Office Action dated Jan. 28, 2014.
Japanese Office Action dated Feb. 4, 2014.
U.S. Office Action issued in U.S. Appl. No. 12/432,184 dated May 22, 2014.
Korean Office Action dated May 26, 2014.
U.S. Notice of Allowance issued in U.S. Appl. No. 12/757,339 dated May 28, 2014.
U.S. Office Action issued in U.S. Appl. No. 13/382,334 dated Jun. 5, 2014.
Australian Office Action dated. Sep. 22, 2014.
Chinese Office Action dated Oct. 8, 2014.
U.S. Notice of Allowance issued in U.S. Appl. No. 13/382,334 dated Nov. 12, 2014.
U.S. Office Action issued in U.S. Appl. No. 13/562,704 dated Nov. 19, 2014.
Chinese Office Action dated Oct. 30, 2014.
Japanese Office Action dated Nov. 18, 2014.
U.S. Notice of Allowance issued in U.S. Appl. No. 13/922,669 dated Dec. 31, 2014.
Chinese Office Action dated Dec. 3, 2014.

* cited by examiner (a)

(b)

DIAGNOSTIC SYSTEM AND METHOD FOR HOME APPLIANCE

CROSS-REFERENCE TO RELATED APPLICATION

This application claims the priority benefit of Korean Patent Application No. 10-2009-0067904, filed on Jul. 24, 2009 in the Korean Intellectual Property Office, the disclosure of which is incorporated herein by reference.

BACKGROUND OF THE INVENTION

1. Field of the invention

The present invention relates to a diagnostic system and method for a home appliance, and more particularly to a home appliance diagnostic system and method for outputting product information of a home appliance in the form of a predetermined sound signal to facilitate state inspection and after-sale service for the home appliance.

2. Description of the Related Art

In operation, a home appliance stores values set for execution of the operation, information generated during the operation, fault information, etc. Particularly, in the event of a fault, the home appliance outputs a predetermined alarm, thereby enabling the user to recognize the state of the home appliance. The home appliance may output detailed fault information through its output device, for example, a display device or lamp, as well as simply notifying the user of completion of an operation or occurrence of a fault.

On the other hand, in the event of a fault in the home appliance, the user may utilize an after-sale service of calling a service center to ask advice on the state of the home appliance or request a service technician for the home appliance.

In this case, the home appliance generally outputs fault information simply or as a code value that cannot be understood by the user. For this reason, the user may have difficulty in coping with the fault in the home appliance and in accurately communicating the state of the home appliance to the service center even though contacting the service center. Consequently, when a service technician visits the user's home, a lot of time and cost may be taken for the service technician to repair the home appliance due to lack of accurate prior knowledge as to the state of the home appliance. For example, provided that a part required for repair of the home appliance is not prepared in advance, the service technician will have the inconvenience of re-visiting the user's home, resulting in an increase in repair time.

In order to solve the above problem, the home appliance may be connected to a server of the service center via a communication unit. However, in this case, it is necessary to construct a communication network.

With technological development, a fault may be remotely diagnosed over a telephone network.

European Patent No. 0510519 discloses a technique for transmitting fault information of a home appliance to a service center via a modem connected to the home appliance over a telephone network. However, this technique requires continuous connection of the modem to the home appliance. Particularly, in the case where the home appliance is a laundry treatment machine that is usually installed outdoors, a spatial restriction may be imposed on connecting the laundry treatment machine to the telephone network.

U.S. Pat. No. 5,987,105 discloses a technique for converting fault information of a home appliance into a sound signal of an audible frequency band and transmitting the sound signal to a service center over a telephone using a telephone network. Signal interference may occur depending on an ambient environment in the course of converting the fault information of the home appliance into the sound signal of the audible frequency band and then transmitting the sound signal to a receiver of the telephone. In addition, data may be lost according to characteristics of the telephone network during the transmission of the sound signal over the telephone network.

A sound recognition error may occur due to the length or frequency of the sound signal output from the home appliance, as well as the data loss during the sound signal transmission as mentioned above. Therefore, there is a need for a measure to counter the sound recognition error.

SUMMARY OF THE INVENTION

Therefore, the present invention has been made in view of the above problems, and it is an object of the present invention to provide a home appliance diagnostic system and method in which, in the case where a fault diagnosis of a home appliance cannot be performed due to a low sound recognition rate resulting from an abnormality of a sound signal output from the home appliance or an error in a communication network when the sound signal output from the home appliance is transmitted to a service center and a diagnostic server thus performs the fault diagnosis of the home appliance, the home appliance performs a sound signal re-output operation in such a manner that it does not re-output the same sound signal, but re-outputs the same product information in the form of a different sound signal.

In accordance with an aspect of the present invention, the above and other objects can be accomplished by the provision of a home appliance including a selector for inputting a command for execution of a fault diagnosis of the home appliance, a memory for storing product information of the home appliance for the fault diagnosis, a controller for, when the fault diagnosis execution command is input by the selector, changing an operating mode of the home appliance to a smart diagnosis mode and encoding the product information stored in the memory to generate a digital signal including a plurality of frames, a modulator for generating a signal of a frequency corresponding to the digital signal for a specified symbol time, and a sound output device driven by the modulator for outputting a sound signal corresponding to the frequency signal, wherein the controller changes at least one of the symbol time and frequency when the selector is re-input after the sound signal is output.

In accordance with another aspect of the present invention, there is provided a method for operating a home appliance, including converting pre-stored product information into a digital signal upon inputting a command for execution of a fault diagnosis of the home appliance, outputting a signal of a frequency corresponding to the digital signal as a first sound signal for a predetermined symbol time, re-inputting the fault diagnosis execution command, and changing at least one of the frequency and symbol time to output a second sound signal corresponding to the digital signal, the second sound signal being different from the first sound signal.

In accordance with a further aspect of the present invention, there is provided a home appliance diagnostic system including a home appliance for outputting product information necessary for a fault diagnosis thereof as a sound signal, a diagnostic server for receiving the sound signal and, based on the received sound signal, diagnosing a state of the home appliance, whether a fault has occurred in the home appliance and a cause of the fault and deriving a countermeasure against the fault, and a portable terminal for receiving the sound signal output from the home appliance and transmitting the same to the diagnostic server over a communication network, wherein the diagnostic server checks an error of the received sound signal and requests the home appliance of sound signal re-output through the portable terminal when the received sound signal is abnormal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
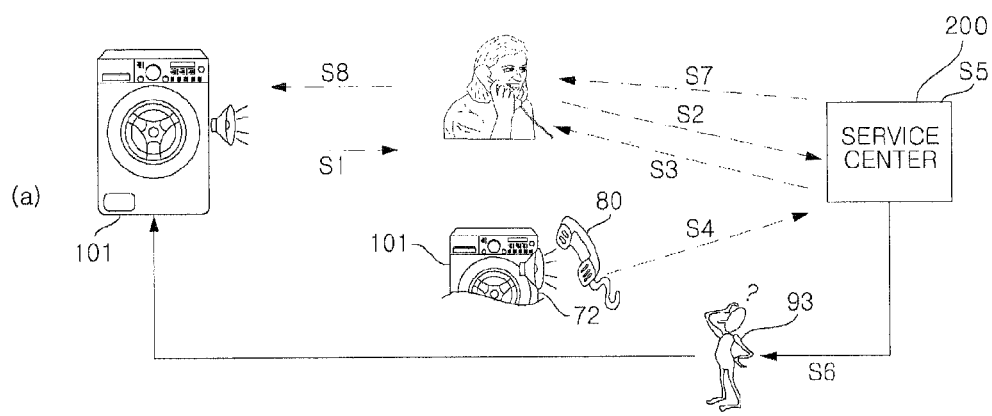
FIG. 1 is a schematic view showing the configuration of a home appliance diagnostic system according to an embodiment of the present invention.
Figure 1:
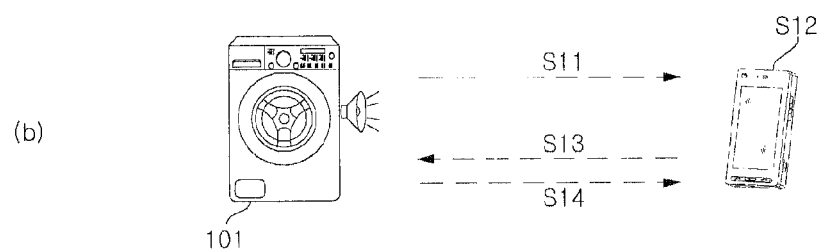

FIG. 1 is a schematic view showing the configuration of a home appliance diagnostic system according to an embodiment of the present invention. Referring to FIG. 1, a home appliance of the present invention may be included in the diagnostic system to undergo a diagnosis of the state and fault thereof from a service center in the diagnostic system. The service center includes a diagnostic server having information about the home appliance and a diagnosis program.

The home appliance diagnostic system is configured in such a manner that, when a home appliance 101 in each home outputs information about the operation thereof in the form of a sound signal, the sound signal, which includes product information, is transmitted to a service center 200 over a telephone network so that the service center 200 may diagnose the state of the home appliance 101 to determine whether the home appliance 101 is out of order.

The home appliance 101 includes a display device for displaying predetermined data. The display device is a light emitter such as a light emitting diode (LED), liquid crystal display (LCD) or an organic electro-luminescent (EL) display, and visually displays state information or fault information of the home appliance 101. The home appliance 101 further includes a sound output device for outputting a sound signal. The sound output device reproduces and outputs information about the operation, state or fault of the home appliance 101 as a predetermined sound signal.

When the home appliance 101 malfunctions or operates abnormally, it notifies the user of occurrence of a fault through the display device or sound output device (S1).

The user confirms product information of the home appliance 101 displayed on the display device of the home appliance 101 and then controls the operation of the home appliance 101 or requests repair of the home appliance 101 from the service center 200. At this time, the user may contact the service center 200 to notify the service center 200 that a fault has occurred in the home appliance 101 and ask advice on the fault (S2).

In the case where the user connects to the service center 200 and manipulates a selector of an input device in the home appliance 101 in response to a request from the service center 200 (S3), the home appliance 101 does not output the product information simply, but converts the product information into a predetermined sound signal and outputs the sound signal through the sound output device. The sound signal including the product information, output in this manner, is transmitted to the service center 200 over a communication network (S4).

At this time, the user may notify the service center 200 of model information and fault symptoms of the home appliance 101 and place a portable terminal 80 close to a sounding portion of the home appliance 101, that is, the sound output device during the call with the service center 200 to transmit the sound signal including the product information of the home appliance 101 to the service center 200. In this manner, the user may transmit the sound signal including the product information of the home appliance 101 to the service center 200 using his/her telephone or mobile phone to request an after-sale service (A/S) for the home appliance 101.

The service center 200 receives the sound signal output from the home appliance 101 over a communication network connected thereto, for example, a telephone network, and checks the product state of the home appliance 101 based on the received sound signal to diagnose whether the home appliance 101 is out of order (S5).

Based on a result of the diagnosis, the service center 200 dispatches a service technician 93 to the user's home to provide a service suitable for the product state and fault diagnosis of the home appliance 101 (S6). In step S6, the diagnosis result may be transmitted to a terminal of the service technician 93 so that he/she may fix the home appliance 101. As needed, the service center 200 may connect with the user through the communication network to provide the diagnosis result to the user in the form of a voice through a customer service agent or in the form of predetermined data (S7).

Therefore, when the user connects to the service center 200 through a communication network, for example, a telephone network, the diagnostic system can accurately determine and cope with the state of the home appliance 101 based on a sound signal, thereby providing a rapid service.

Although the home appliance 101 of the present invention will hereinafter be described for illustrative purposes as being a laundry treatment machine, the present invention is not limited thereto. Rather, it is to be clearly understood that the present invention is applicable to all home appliances including TVs, air conditioners, refrigerators, electric rice cookers, and microwave ovens.

Figure 2:
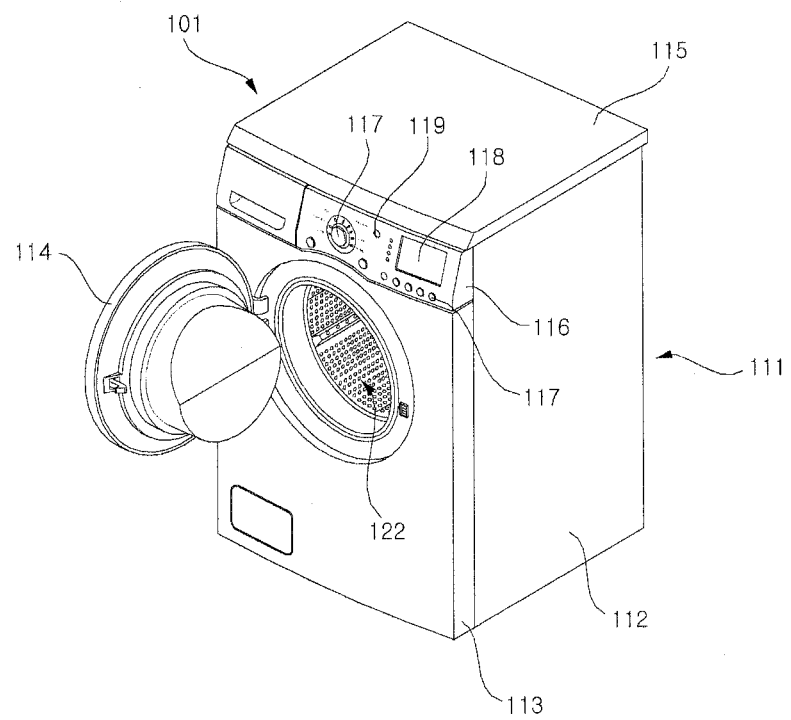
FIG. 2 is a perspective view showing the configuration of a home appliance according to an embodiment of the present invention.

FIG. 2 is a perspective view showing the configuration of a home appliance according to an embodiment of the present invention. A description will hereinafter be given of a laundry treatment machine as an example of the home appliance. Referring to FIG. 2, the laundry treatment machine 101, which is the home appliance of the present invention, includes a cabinet 111, a tub 122 disposed inside the cabinet 111 for washing laundry, a motor (not shown) for driving the tub 122, a wash water supply (not shown) for supplying wash water to the tub 122, and a drainage device (not shown) for draining the wash water externally after the laundry is washed.

The cabinet 111 includes a cabinet body 112, a cabinet cover 113 coupled to a front side of the cabinet body 112, a control panel 116 disposed over the cabinet cover 113 for controlling the operation of the laundry treatment machine 101, and a top plate 115 disposed over the control panel 116 and coupled to the cabinet body 112. The cabinet cover 113 includes a hole (not shown) for putting in or taking out the laundry therethrough, and a door 114 for pivotally moving to open/close the hole.

The control panel 116 is provided with an input device including a manipulator 117 having a plurality of manipulating keys for manipulating the laundry treatment machine 101, a sound output device 160 for outputting a sound signal indicative of the operating state of the laundry treatment machine 101, and a display device 118 for displaying the operating state of the laundry treatment machine 101 in the form of text, a numeral, a special symbol, an image, or the like. In the input device, the manipulator 117 may be configured with an input unit for applying a certain signal by push, contact, pressure, rotation, or the like, such as a key, a button, a switch, a rotary switch, or a touch input unit.

The sound output device 160 is provided at a rear side of the control panel 116 to output a sound signal from the inside of the control panel 116. The sound output device 160 is spaced apart from the manipulator 117, a selector 130 or a sound output hole 119 by a predetermined distance so that it can be protected from water or foreign substances incoming from the outside.

The sound signal output from the sound output device 160 is externally emitted through cracks of portions of the control panel 116, in which keys of the manipulator 117 or selector 130 are formed, along a sound path or sound guide portion formed at the rear side of the control panel 116. Alternatively, in the case where the separate sound output hole 119 is provided, the sound signal output from the sound output device 160 may be externally emitted through the sound output hole 119.

Here, it is preferable that the keys of the manipulator 117 or selector 130 be constructed so as to enlarge the gap between the control panel 116 and each of the keys or to permit an internal sound to be emitted externally when pressed.

The sound output device 160 may include at least one sound output device. For example, in the case where the sound output device 160 includes two sound output devices, one of the sound output devices may output a sound signal of a combination of predetermined frequencies including product information of the home appliance and the other may output an effect sound or alarm sound of the home appliance and an indication sound indicative of the start or end of the output of the sound signal including the product information.

When the user pushes the selector, included in the input device, the laundry treatment machine 101 receives a smart diagnosis mode entry command and a signal output command, converts product information into a digital signal of a predetermined format and applies the digital signal to the sound output device 160. As the sound output device 160 operates in response to the digital signal, it outputs a predetermined sound signal.

The sound signal output from the sound output device 160 is transmitted to the service center 200 through the portable terminal 80, connected to a communication network. Here, the communication network may be, for example, a telephone network or mobile network, and the portable terminal 80 may be, for example, a telephone or mobile phone.

The service center 200, which includes the diagnostic server, receives the sound signal output from the laundry treatment machine 101 and analyzes the received sound signal, so as to acquire operation information and fault information of the laundry treatment machine 101. As a result, the service center 200 transmits a countermeasure against a faulty operation of the laundry treatment machine 101 to the user or dispatches a service technician to the user's home.

Figure 3:
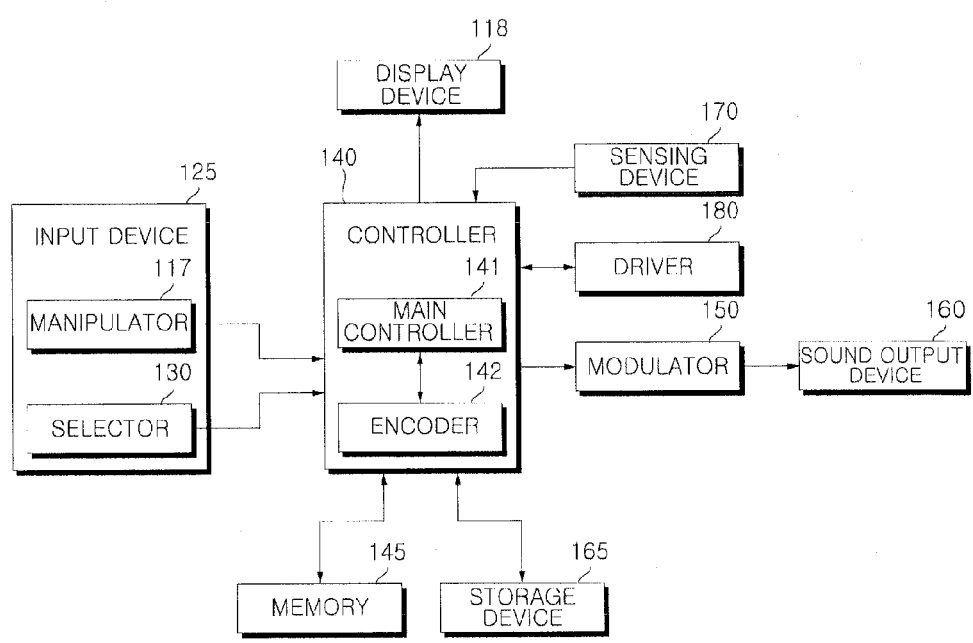
FIG. 3 is a block diagram showing a configuration for control of a home appliance according to an embodiment of the present invention.

FIG. 3 is a block diagram showing a configuration for control of a home appliance according to an embodiment of the present invention. The home appliance 101, configured as stated above with reference to FIG. 2, has a control configuration for performing a washing mode, a rinsing mode, a spin-drying mode, etc. for laundry within the home appliance 101, processing data generated during the operation of the home appliance 101, and, when a smart diagnosis mode is set based on an input of a selector, generating product information including data of the home appliance 101 in the form of a digital signal of a predetermined format and outputting a predetermined sound signal based on the digital signal.

Referring to FIG. 3, the home appliance 101 includes an input device 125, a sensing device 170, a memory 145, a storage device 146, a driver 180, a modulator 150, the sound output device 160, and a controller 140 for controlling the entire operation of the home appliance 101.

The input device 125 is provided with at least one input unit for inputting a predetermined signal or data to the home appliance 101 according to a user manipulation. The input device 125 includes the manipulator 117 and the selector 130.

The selector 130 has at least one input unit. Upon selection of the smart diagnosis mode, the selector 130 applies a signal output command to the controller 140 so that product information is output in the form of a predetermined sound signal through the sound output device 160.

The selector 130 may be provided with input units separate from those of the manipulator 117. Alternatively, the manipulator 117 may include two or more input units that may operate or be recognized as the selector when manipulated simultaneously, or a specific input unit that may operate or be recognized as the selector when manipulated consecutively or for a predetermined time or more.

As the smart diagnosis mode is entered, the selector 130 turns on/off the sound output device 160. That is, when the signal output command is input by the selector 130, a digital signal including product information is output in the form of a predetermined sound signal in response to a control command from the controller 140. At this time, the sound output device 160 operates to output the sound signal.

The manipulator 117 receives data such as an operation course or operation setting according to the operation of the home appliance 101 and applies the received data to the controller 140. The manipulator 117 also receives settings related to sound signal output. That is, the manipulator 117 receives values for setting a sound signal output method, the level of a sound signal to be output, etc.

The input device 125 including the selector 130 and the manipulator 117 may be configured to include buttons, a dome switch, a touch pad (static pressure/capacitance), a jog wheel, a jog switch, a finger mouse, a rotary switch, a jog dial, or the like. Any device may serve as the input device 125 so long as it generates predetermined input data by a manipulation such as push, rotation, pressure or contact.

The sensing device 170 includes at least one sensor for sensing a temperature, a pressure, a voltage, current, the level of water, the number of rotations, or the like, and applies sensed or measured data to the controller 140. For example, when water is supplied or drained to or from the laundry treatment machine, the sensing device 170 may measure the level of the water, the temperature of the supplied water, and the rotation speed of the tub or drum.

The driver 180 controls driving of the home appliance 101 in response to a control command from the controller 140 such that the home appliance 101 performs a set operation. Therefore, the laundry treatment device washes laundry by performing a series of modes including a washing mode, a rinsing mode and a spin-drying mode.

For example, in the case of the laundry treatment machine, the driver 180 may drive a motor that rotates the tub or drum, and control the operation of the motor to wash soiled laundry through rotation of the tub or drum. Also, the driver 180 may control a valve in response to a control command from the controller 140 to supply or drain water.

The memory 145 includes all data storage units including a read only memory (ROM) or electrically erasable programmable ROM (EEPROM) for storing control data for the home appliance, and a storage area for storing data generated by processing of a processor. The storage device 146 is a buffer for the controller 140 that temporarily stores data. The storage device 146 may be, for example, a dynamic random access memory (DRAM) or static RAM (SRAM). As needed, the storage device 146 may be incorporated into the controller 140 or memory 145.

While the home appliance 101 performs a desired operation, the memory 145 stores operation information including operating state data generated during the operation and set data input by the manipulator 117 such that the home appliance 101 performs the desired operation, usage information including the number of occurrences of a specific operation in the home appliance 101 and model information of the home appliance 101, and fault information including information about the cause or position of a fault when the home appliance 101 malfunctions.

That is, the memory 145 stores product information including the operation information, the usage information and the fault information. The storage device 146 also stores temporary data about the operation information and fault information generated during the operation of the home appliance. For example, the product information may include the number of uses of the laundry treatment machine, a set course, option setting information, an error code, a value measured by a sensor, data calculated by the controller 140, and operation information of each component.

In the case of the laundry treatment machine, the operation information includes information necessary for the operation of the laundry treatment machine, such as information about the washing mode of the laundry treatment machine, information about the spin-drying mode of the laundry treatment machine and information about the rinsing mode of the laundry treatment machine.

The fault information may include, when the laundry treatment machine performs each operation, various information including fault information generated during each operation, device fault information of the laundry treatment machine, error codes corresponding to fault information, information of the controller 140, values sensed by the sensing device 170, sensed values of the motor, fault information of the wash water supply, and fault information of the drainage device.

The usage information may include various information including the number of uses of the laundry treatment machine by the user, a course set by the user, and option setting information set in the laundry treatment machine. That is, the usage information may include contents input to the laundry treatment machine by the user or information initially set in the laundry treatment machine.

The controller 140, when a signal for the smart diagnosis mode entry is input from the selector 130, fetches product information stored in the memory 145 or storage device 146, generates a digital signal of a predetermined format from the product information and applies the digital signal to the modulator 150. Also, as the selector 130 is manipulated, the controller 140 controls the sound output device 160 to operate it.

The controller 140 includes a main controller 141 for controlling a flow of data being input or output to or from the home appliance 101, generating and applying a control command based on data input from the sensing device 170, or providing sensed data to the driver 180 to control the driver 180 to operate the home appliance 101, and an encoder 142 for converting product information into a digital signal of a predetermined format in response to an input of the selector 130 such that a sound signal based on the digital signal is output.

The main controller 141, when the smart diagnosis mode is entered in response to the input of the selector 130, outputs a start sound indicating the start of the smart diagnosis mode through the sound output device 160 and displays predetermined data indicating the execution of the smart diagnosis mode through the display device 118.

Also, when a digital signal generated by the encoder 142 is applied to the modulator 150 and a sound signal is thus output through the sound output device 160, the main controller 141 controls the sound output device 160 to output a predetermined indication sound before and after the output of the sound signal. As needed, the indication sound may be omitted.

On the other hand, in the case where the sound output device 160 includes two or more sound output devices, the main controller 141 may control the sound output devices to output the indication sound and the sound signal including the product information through different ones of the sound output devices, respectively.

Upon entry of the smart diagnosis mode, the main controller 141 disables the manipulator 117 except for the selector 130 and a power key and controls the sensing device 170 and the driver 180 to make the home appliance 101 discontinue all other operations.

Also, when any one manipulating key of the manipulator 117 for setting of the operation of the home appliance 101 is input after power input, the main controller 141 does not start the smart diagnosis mode even though the selector 130 is input. Particularly, in the case where the selector 130 is not provided separately and an input of a combination of two or more of a plurality of manipulating keys of the manipulator 117 is recognized as the input of the selector 130, the main controller 141 starts the smart diagnosis mode only when the selector 130 is input by a specified key combination immediately without any other input after the input of the power key.

That is, the setting of the operation of the home appliance by the manipulator 117 is considered to indicate that the user has no intention of entering the smart diagnosis mode, and the main controller 141 thus does not enter the smart diagnosis mode. Also, it is possible to prevent the smart diagnosis mode from being entered unnecessarily due to a faulty manipulation of the manipulator 117.

On the other hand, in the case where the selector 130 is re-input within a predetermined time after the sound signal is output through the sound output device 160, the main controller 141 transmits a control command indicative of the re-input of the selector 130 to the encoder 142.

Also, when the selector 130 is input a third time, the main controller 141 applies a control command indicative of the third input of the selector 130 to the encoder 142.

The encoder 142 fetches the product information stored in the memory 145, encodes the product information according to a predetermined encoding scheme and adds a preamble and an error check bit to the resulting data signal, so as to generate a digital signal of a predetermined format. The encoder 142 generates a digital signal consisting of a plurality of symbols by encoding the product information.

In the course of generating the digital signal, the encoder 142 may divide the digital signal into a plurality of frames by a predetermined size and packetize the frames into a packet. Also, the encoder 142 may set an inter-frame space (IFS) between adjacent ones of the frames of the digital signal such that no sound signal is output for a predetermined time. Also, during signal conversion, the encoder may set a dead time in a symbol in a period in which a data value is changed, in order to eliminate reverberation that affects the next signal conversion due to the principle of charging and discharging of a capacitor.

Assuming that the length of each of the symbols constituting the digital signal is a symbol time and the fundamental length of a frequency signal constituting the sound signal from the sound output device 160, corresponding to each symbol, is also a symbol time, the encoder 142 may set a dead time within the symbol time with respect to one symbol. In this case, the length of the dead time varies with the length of the symbol time.

The product information includes operation information including operation settings, operating state data, etc., usage information, and fault information about a faulty operation, as stated above. The product information is data consisting of a combination of 0s or 1s, which is a digital signal of a format readable by the controller 140.

The controller 140 generates a digital signal of a predetermined format by classifying data of the product information, incorporating specific data into the classified data and dividing the resulting data by a certain size or combining the resulting data, and applies the generated digital signal to the modulator 150. Also, the controller 140 may change the number of symbols corresponding to output frequency signals according to the number of frequencies used in the modulator 150.

When a control command based on a re-input of the selector 130 is input from the main controller 141, the encoder 142 changes a preset symbol time or a frequency used in the modulator 150 before a sound signal is re-output. In this case, the encoder 142 changes the preset symbol time or the frequency whenever the control command based on the re-input of the selector 130 is input from the main controller 141. As needed, the encoder 142 may change both the symbol time and frequency.

Preferably, in the symbol time change for the sound signal re-output, the encoder 142 may increase the symbol time when the sound signal re-output results from a matter of a sound recognition rate, and reduce the symbol time when the sound signal re-output results from a transmission time or an error in transmission. The increase in the symbol time increases the total length of a sound signal to be output and enhances the sound recognition rate, and the reduction in the symbol time reduces the total length of the sound signal to be output and thus changes a transmission rate, thereby changing an error rate in transmission. In the frequency change, the encoder 142 may also increase or reduce the frequency according to the re-output cause, in the same manner as described above. As to the sound recognition rate, the encoder 142 may change a frequency separation between two frequencies used.

The encoder 142 may determine the increase or reduction in the symbol time or frequency as the manipulator 117 is manipulated by the user.

Also, according to an agreement with the diagnostic server, the encoder 142 may store information about symbol times or frequencies corresponding to the number of re-outputs in the memory 145 and may change the symbol time or frequency of a sound signal to be re-output, based on the stored information.

The encoder 142 may include information about the changed symbol time or frequency in the sound signal or transmit the information separately from the sound signal.

The modulator 150 applies a drive signal to the sound output device 160 in response to the digital signal from the controller 140 such that the sound output device 160 outputs a sound signal. The sound signal output in this manner includes product information.

The modulator 150 applies the drive signal to the sound output device 160 such that a specified frequency signal corresponding to one of the symbols constituting the digital signal is output for a symbol time.

When the symbol time is changed by the encoder 142, the modulator 150 controls the sound output device 160 such that a specified frequency signal corresponding to the digital signal is output for the changed symbol time.

Also, in the case where a frequency used is changed, the modulator 150 changes a frequency generated by frequency oscillator (not shown), changes a frequency corresponding to a logic value of the digital signal and outputs a signal of the changed frequency.

The modulator 150 performs a control operation such that the sound signal is output through a plurality of frequency bands in accordance with the digital signal while changing the number of symbols for each frequency signal based on the number of used frequencies in accordance with setting of the controller 140. For example, one frequency signal may be output per symbol when two frequencies are used and one frequency signal may be output per 2 symbols when four frequencies are used.

The modulator 150 includes frequency oscillators (not shown) for generating as many oscillation frequencies as the number of available frequencies and controls the sound output device 160 to output frequency signals from frequency oscillators that are specified in accordance with the digital signal.

The modulator 150 converts the digital signal from the controller 140 into the sound signal using one of frequency shift keying, amplitude shift keying, or phase shift keying while controlling the sound output device 160 to output the sound signal in accordance with the digital signal.

Frequency shift keying converts the digital signal into a signal having a frequency corresponding to a data value of the digital signal, amplitude shift keying converts the digital signal by changing the amplitude of the digital signal according to the data value, and phase shift keying converts the digital signal by changing the phase of the digital signal according to the data value.

Binary frequency shift keying (BFSK), which is a type of frequency shift keying, converts the digital signal into a signal of a first frequency when the digital signal has a data value of 0 and into a signal of a second frequency when it has a data value of 1. For instance, BFSK converts a data value 0 into a signal of a frequency of 2.6 KHz and converts a data value 1 into a signal of a frequency of 2.8 KHz, as will be described later with reference to FIG. 5.

Amplitude shift keying may convert the digital signal into a signal of a frequency of 2.6 KHz with an amplitude of 1 when the digital signal has a data value of 0 and an amplitude of 2 when it has a data value of 1.

While the modulator 150 has been described as using frequency shift keying as an example, the modulation scheme used may be changed. Also, the frequency bands used are merely an example and may be changed.

If a dead time is set in the digital signal, the modulator 150 discontinues modulation during an interval in which the dead time is set in the digital signal. The modulator 150 modulates the digital signal using pulse width modulation (PWM) and switches an oscillation frequency for modulation off during the interval, in which the dead time is set, to temporarily discontinue the frequency signal modulation during the dead time. This controls inter-symbol reverberation of the sound signal output from the sound output device 160.

The sound output device 160 is activated or deactivated according to a control command from the controller 140. The sound output device 160 emits a predetermined sound signal including product information by outputting a frequency signal corresponding to the digital signal for a specified time under the control of the modulator 160.

Here, one or more sound output devices 160 may be provided. For example, when two sound output devices are provided, one of the two sound output devices may output a sound signal including product information and the other may output an alarm sound or an effect sound corresponding to state information of the home appliance and may also output an indication sound before a smart diagnostic mode is entered or before the sound signal is output.

The sound output device 160 is deactivated after completely outputting the digital signal as the predetermined sound signal in accordance with the output of the modulator 150. When the selector 130 is manipulated again, the sound output device 160 is reactivated to output the predetermined sound signal carrying product information through the above-described process.

When the sound output device 160 performs a sound signal re-output operation, it outputs a sound signal different from the first output sound signal a second time with respect to the same digital signal according to a frequency or symbol time changed by the encoder 142 and modulator 150. In a third re-output operation, the sound output device 160 outputs a sound signal of a symbol time or frequency different from those of the first and second output sound signal. Here, although the first, second and third output sound signals are different due to changes in the symbol time and available frequency, the digital signal for the sound signal output is not changed.

While a sound output unit such as a speaker or a buzzer may be used as the sound output device 160, a speaker having a wide reproduction frequency range is preferable in order to use a plurality of frequency bands.

When the smart diagnosis mode is entered, the sound output device 160 emits a start sound indicating the start of the smart diagnosis mode according to a control command from the main controller 141 and also outputs respective predetermined indication sounds at the start and end of outputting a sound signal carrying product information.

In response to a control command from the main controller 141, the display device 118 displays, on a screen, information such as information received from the selector 130 and the manipulator 117, operating state information of the home appliance 101, and information associated with completion of the operation of the home appliance 101. When the home appliance 101 operates abnormally, the display device 118 also displays fault information about the abnormality on the screen.

When the sound signal re-output operation is performed by multiple manipulations of the selector 130, the display device 118 displays the number of re-outputs on the screen.

The display device 118 displays information indicating the smart diagnosis mode when the smart diagnosis mode has been started in response to a control command from the main controller 141. When the sound output device 160 outputs a sound signal, the display device 118 displays the progress of the sound output in the form of at least one of text, an image, and a numeral.

The home appliance 101 may include an output unit such as an illuminating or flickering lamp, a vibrator, or the like, which will not be described herein, in addition to the sound output device 160 and the display device 118.

Figure 4:
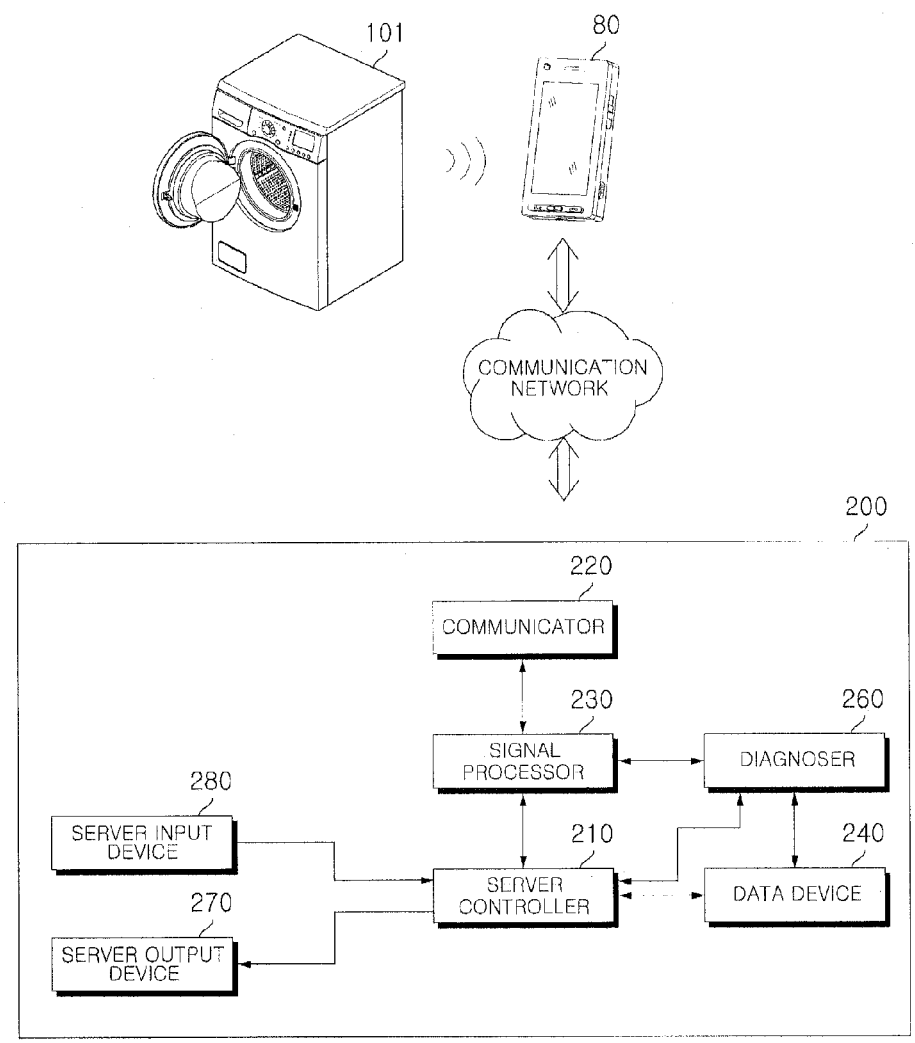
FIG. 4 is a block diagram showing the configuration of a diagnostic server of a service center in a home appliance diagnostic system according to an embodiment of the present invention.

FIG. 4 is a block diagram showing the configuration of a diagnostic server of a service center in a home appliance diagnostic system according to an embodiment of the present invention.

When the home appliance 101 constructed as stated above emits a sound signal, the sound signal is provided to the portable terminal 80 and then transmitted to the service center 200 over the communication network. The service center 200 receives the sound signal from the portable terminal 80 and applies it to the diagnostic server, which then performs a fault diagnosis of the home appliance 101 based on the sound signal.

Referring to FIG. 4, the diagnostic server of the service center 200 includes a communicator 220, a signal processor 230, a data device 240, a server input device 280, a server output device 270, a diagnoser 260, and a server controller 210 for providing overall control to the diagnostic server.

The server input device 280 and the server output device 270 provide a predetermined input/output interface, through which a manager of the service center 200, a user, and a service technician may check the progress and result of a diagnosis, and receive or output data.

The server input device 280 includes input units such as buttons, keys, a touchpad or a switch that the user of the service center 200 manipulates. The server input device 280 includes a connection interface for interfacing with an external input device and a portable memory.

When a specific input unit of the server input device 280 is manipulated, the server input device 280 applies a signal to the server controller 210 to allow the diagnostic server to receive a sound signal from the home appliance 101 through the telephone or mobile phone of the user connected to the diagnostic server over the telephone network or mobile network.

The server output device 270 includes a display for displaying operating information and diagnosis results of the diagnostic server.

The communicator 220 is connected to an internal network of the service center 200 and transmits and receives data to and from the network. The communicator 220 is also connected to an external network such as the Internet to communicate with the external network. Especially upon receipt of a recording command or reception command through the server input device 280, the communicator 220 receives a sound signal from the home appliance over the telephone network and transmits a diagnosis result externally when a diagnosis is completed, according to a control command from the server controller 210.

The communicator 220 transmits the diagnosis result to the terminal of the service technician or transmits a diagnosis result report to a pre-registered terminal or email address of the user. According to a format of data to be transmitted, the communicator 220 may transmit the data directly to the terminal or transmit the data to a message center of the communication network or a specific mail server.

The data device 240 stores control data for controlling the operation of the diagnostic server, sound signal received from the home appliance such as a laundry treatment machine in the form of sound signal data, reference data for sound signal or sound conversion and product information extraction, and fault diagnostic data for diagnosing whether the home appliance is out of order and the cause of a fault.

Also, the data device 240 stores temporary data generated during the process of converting received data or detecting product information and also stores diagnosis result data and a diagnosis result report to be transmitted to the user.

The data device 240 receives, outputs, manages and updates data under the control of the server controller 210.

The server controller 210 controls transmission and reception of data through the communicator 220 and flow of data through the server output device 270. In addition, the server controller 210 controls the operations of the signal processor 230 and the diagnoser 260 to diagnose a fault of the home appliance 101. The server controller 210 also performs a control operation such that the diagnosis result of the diagnoser 260 is output through the server output device 270 or is transmitted through the communicator 220.

The signal processor 230 converts the received sound signal into a readable sound signal, extracts product information from the converted sound signal, and applies the product information to the diagnoser 260.

The signal processor 230 converts and stores the received analog sound signal. The signal conversion is the reverse of signal conversion in the home appliance 101. Preferably, each home appliance and the diagnostic server convert data using the same scheme preset by agreement therebetween. The signal processor 230 converts an analog sound signal in a predetermined frequency band into a digital signal through demodulation using one of frequency shift keying, amplitude shift keying or phase shift keying.

After extracting the digital signal from the demodulated data, the signal processor 230 acquires the product information from the digital signal. The signal processor 230 detects a preamble, acquires the digital signal including the product information based on the preamble, and extracts the product information of the home appliance from the digital signal through analysis of the digital signal of a predetermined format.

The signal processor 230 converts and analyzes the digital signal based on structure or format information and frequency characteristic data of the digital signal stored in the data device 240. The product information is not only applied to the diagnoser 260, but is also stored in the data device 240.

The diagnoser 260 determines the operating state of the home appliance 101 and whether the home appliance 101 is out of order by analyzing the input product information according to a control command from the server controller 210. The diagnoser 260 has a diagnosis program for analyzing the product information of the home appliance and determining the state of the home appliance based on the product information, and diagnoses the home appliance 101 using the diagnostic data stored in the data device 240.

Also, the diagnoser 260 analyses the cause of the fault, derives a solution or a measure to take for the fault, and generates a diagnosis result in relation to a service direction.

The server controller 210 controls data transmission and reception through the communicator 220 and data input and output through the server input device 280 and the server output device 270. In addition, the server controller 210 controls the operations of the signal processor 230 and the diagnoser 260 to diagnose the fault of the home appliance 101. The server controller 210 performs a control operation such that the diagnosis result of the diagnoser 260 is output through the server output device 270 or is transmitted through the communicator 220.

The server controller 210 performs a control operation such that the diagnosis result of the diagnoser 260 is output through the server output device 270. Hence, the service center 200 notifies the user of an action to be taken in relation to malfunction of the home appliance 101 by voice over the telephone network or dispatches a service technician to the user. Also, the server controller 210 transmits the diagnosis result to the terminal of the service technician through the communicator 220.

In the mean time, when an error has occurred during the signal processing or the diagnosis process, the server controller 210 outputs an alarm sound or a message requesting sound signal retransmission of the home appliance 101 through the server output device 270. In this case, the service center 200 requests the user connected thereto through the communication network to re-output a sound signal of the home appliance.

When a diagnosis request is input through the input device 280, the server controller 210 receives call data including the contents of a call between the user and the service center 200 through the communicator 220 and analyzes the received call data to determine call quality or signal quality. The server controller 210 also performs error checking to determine whether there is an error in a received sound signal.

The server controller 210 determines whether the sound signal is readable, according to the signal quality or call quality, and determines whether the sound signal is appropriate the fault diagnosis, according to whether there is an error in the sound signal.

It may be hard to recognize the sound signal, due to a problem occurring in the home appliance during the sound signal output of the home appliance or a very low volume of the sound signal output from the home appliance. Also, the sound signal may be distorted or lost due to an error in a communication network in the course of transmitting the output sound signal to the service center 200 over the communication network via the portable terminal of the user. In this regard, the server controller 210 determines whether the signal quality has been degraded due to such causes, so as to determine whether the fault of the home appliance is diagnosable based on the sound signal.

Based on a result of the determination, the server controller 210 controls the signal processor 230 and the diagnoser 260 such that they perform signal conversion and diagnosis, or outputs a message or alarm sound requesting sound signal re-output through the server output device 270.

That is, in the case where the signal conversion is impossible or the diagnosis is impossible, the server controller 210 may output a message requesting re-output of a sound signal of the home appliance through the server output device 270. In this case, the service center 200 requests the user connected thereto through the communication network of the sound signal re-output of the home appliance. Also, the server controller 210 may request the user of a volume adjustment for the sound signal re-output of the home appliance.

When the user re-outputs a sound signal of the home appliance in response to the request, the re-output sound signal is transmitted to the service center 200 over the communication network, and the signal quality is again determined with respect to the transmitted sound signal. According to a result of the determination, the server controller 210 requests the user of sound signal re-output or progresses the diagnosis, and, if needed, may judge that the diagnosis cannot be performed.

Upon determining that an abnormality is present in received sound signals a predetermined number of times or more, the server controller 210 judges the diagnosis impossible, and then outputs the judgment through the server output device 270.

In the case where the diagnosis is impossible due to a problem with the home appliance, the service center 200 transmits information indicating that the diagnosis is impossible to the user, and may dispatch a service technician to fix the home appliance.

Also, in the case where the diagnosis is impossible due to an error in a diagnosis program of the server controller 210 itself or fault diagnostic data, the server controller 210 outputs a message indicative of such a situation through the output device 270 such that program bug fix or data update is performed.

On the other hand, in the case where the received sound signal is normal, the server controller 210 applies a control command for signal conversion to the signal processor 230 and a diagnosis execution command to the diagnoser 260, respectively, such that the state or fault of the home appliance is diagnosed as stated above.

Also, when the server controller 210 requests the home appliance of sound signal re-output and thus re-receives a sound signal from the home appliance through the portable terminal, it may receive information about a symbol time or frequency change together, determine a call quality or signal quality of the re-received sound signal based on the received information and then perform the fault diagnosis based on the re-received sound signal.

In addition, the server controller 210 may store symbol times or frequency signals corresponding to the number of re-outputs in the data device 240 according to an agreement with the home appliance, perform signal conversion and decoding for a re-output sound signal based on the stored data and then perform the fault diagnosis based on the decoded sound signal.

Figure 5:
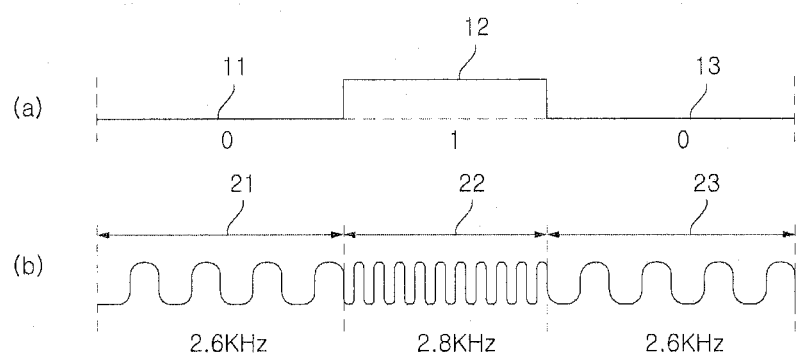
FIG. 5 is a waveform diagram illustrating an example of signal conversion of a home appliance according to an embodiment of the present invention.

FIG. 5 is a waveform diagram illustrating an example of signal conversion of a home appliance according to an embodiment of the present invention. Referring to FIG. 5, a digital signal encoded according to a predetermined scheme by the encoder 142 is frequency-converted by the modulator 150 and then output as a sound signal through the sound output device 160.

For example, the modulator 150 may employ frequency shift keying and use two frequencies, 2.6 KHz and 2.8 KHz.

In this case, the modulator 150 outputs the frequency of 2.6 KHz for a logic value 0 and the frequency of 2.8 KHz for a logic value 1.

In the case where the digital signal is 010, the modulator 150 converts a first bit value 11 of the digital signal into a frequency signal 21 of 2.6 KHz because the first bit value 11 is 0, and a second bit value 12 of the digital signal into a frequency signal 22 of 2.8 KHz because the second bit value 12 is 1. Also, the modulator 150 converts a third bit value 13 of the digital signal into a frequency signal 23 of 2.6 KHz because the third bit value 13 is 0.

Here, each bit of the digital signal generated by the encoder is one symbol, and the temporal length of a symbol, namely, a time taken to output one symbol (bit) is a symbol time.

Figure 6:
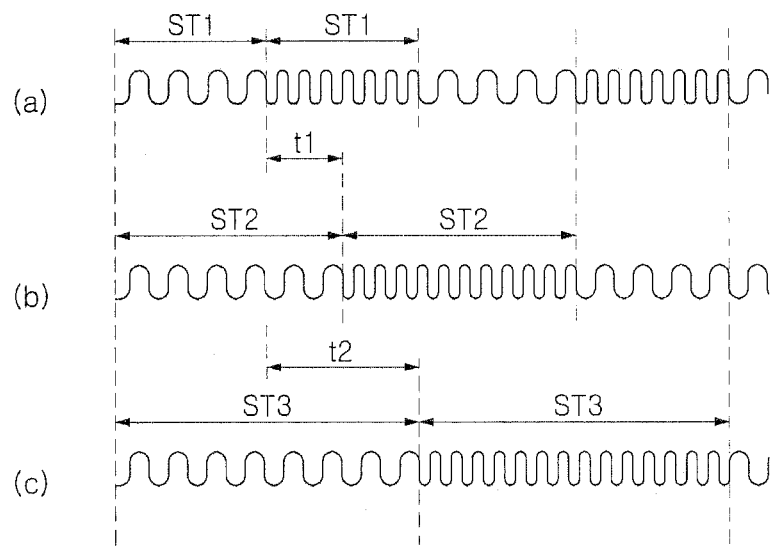
FIG. 6 is a waveform diagram illustrating an example of sound signal output of a home appliance based on a symbol time change according to an embodiment of the present invention.

FIG. 6 is a waveform diagram illustrating an example of sound signal output of a home appliance based on a symbol time change according to an embodiment of the present invention. The service center 200 requests sound signal re-output through the portable terminal connected thereto, and the user of the portable terminal re-manipulates the selector 130 of the home appliance 101 such that a sound signal is re-output from the home appliance 101.

For the sound signal re-output responsive to the request from the service center 200, the home appliance 101 determines second sound signal output based on a re-input of the selector 130 and changes a symbol time for the second sound signal output.

That is, when a digital signal is converted into a signal of a certain frequency by the modulator 150 and then output through the sound output device 160 under the condition that the digital signal is fixed, the home appliance 101 changes a symbol time and, thus, a sound signal output time.

For the second sound signal output, as shown in FIG. 6(*b*), the home appliance 101 increases a first symbol time ST1 in a first sound signal output by a first time t1 and outputs a sound signal for the resulting second symbol time ST2. In this case, the increase in the symbol time ST1 by the first time t1 increases the total sound signal output time to 1.5 times that in the first sound signal output.

For a third sound signal output, as shown in FIG. 6(*c*), the home appliance 101 increases the first symbol time ST1 in the first sound signal output by a second time t2 and outputs a sound signal for the resulting third symbol time ST3. As a result, the total sound signal output time is increased to two times that in the first sound signal output.

Alternatively, the symbol time may be reversely reduced in the order of the third symbol time ST3, second symbol time ST2 and first symbol time ST1.

In the symbol time change based on the request from the service center 200, the home appliance 101 increases the symbol time when the sound signal re-output results from a matter of a sound recognition rate, and reduces the symbol time when the sound signal re-output results from a transmission time or an error in transmission. The increase in the symbol time increases the total length of a sound signal to be output and enhances the sound recognition rate, and the reduction in the symbol time reduces the total length of the sound signal to be output and thus changes a transmission rate, thereby changing an error rate in transmission.

The sound signal re-output may be required when the service center 200 cannot recognize a sound signal due to a matter of the sound signal itself, for example, a symbol time that is too short, or when the service center 200 cannot recognize the sound signal or analyze product information of the sound signal, due to noise or data loss in transmission. In this connection, it is preferable to increase the symbol time.

Therefore, the home appliance 101 outputs, through the sound output device 160, different sound signals having different symbol times corresponding to the number of re-outputs with respect to the same digital signal.

The modulator 150 outputs a signal of a certain frequency corresponding to the digital signal for a changed symbol time through the sound output device 160.

Figure 7:
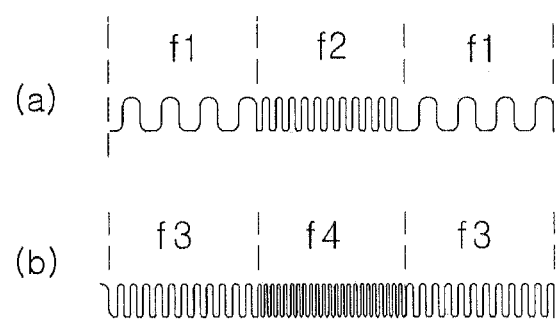
FIG. 7 is a waveform diagram illustrating an example of sound signal output of a home appliance based on a frequency change according to an embodiment of the present invention.

FIG. 7 is a waveform diagram illustrating an example of sound signal output of a home appliance based on a frequency change according to an embodiment of the present invention. Referring to FIG. 7, the service center 200 requests sound signal re-output through the portable terminal connected thereto, and the user of the portable terminal re-manipulates the selector 130 of the home appliance 101 such that a sound signal is re-output from the home appliance 101.

For the sound signal re-output responsive to the request from the service center 200, the home appliance 101 determines second sound signal output based on a re-input of the selector 130 and changes a frequency constituting a sound signal for the second sound signal output.

That is, when a digital signal is converted into a signal of a certain frequency by the modulator 150 and then output through the sound output device 160 under the condition that the digital signal is fixed, the home appliance 101 changes a frequency of a sound signal to be output. In this case, the home appliance 101 may increase or reduce a separation between frequencies used. The frequency change may be made within the range of a reproducible frequency band of the sound output device 160.

The home appliance 101 may output a sound signal using a first frequency f1 and a second frequency f2, as stated previously with reference to FIG. 5, for a first sound signal output, and may output a sound signal using a third frequency f3 and a fourth frequency f4, as shown in FIG. 7, for a second sound signal output.

In the case where a frequency used is changed, there is no change in the total sound signal length within the same symbol time, but the number of pulses per frequency within the symbol time is changed. In this regard, the frequency is set in such a manner that the number of pulses per symbol is at least eight. As needed, the home appliance 101 may change both the frequency and symbol time.

Here, it should be noted that the examples of FIGS. 5 to 7 based on the symbol time and frequency changes are schematically illustrated to describe the sound signal variation depending on the symbol time change and the sound signal variation depending on the frequency change, and the number of pulses per symbol is not limited thereto.

Figure 8:
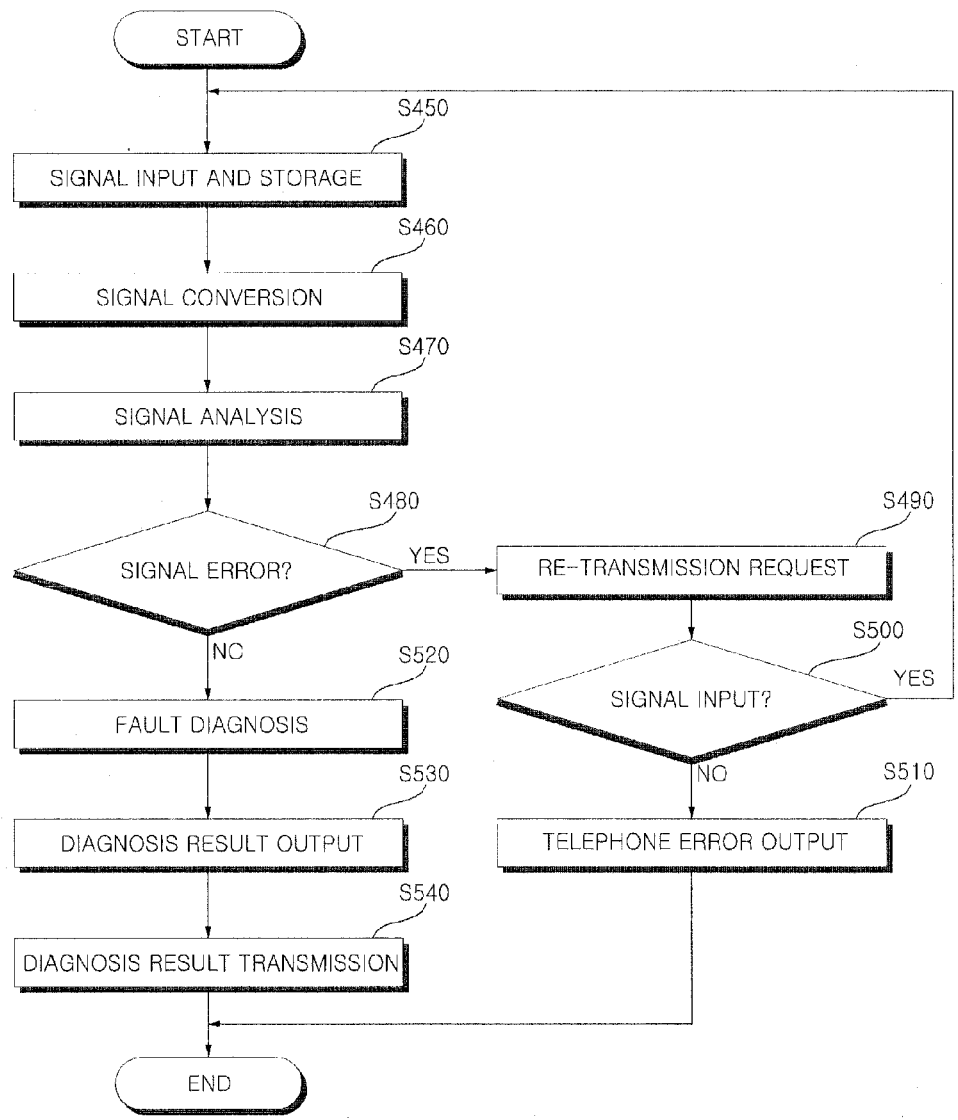
FIG. 8 is a flow chart illustrating a method for determining quality of a sound signal and requesting sound signal re-output based on a result of the determination, during a fault diagnosis by a diagnostic server of a service center according to an embodiment of the present invention.

FIG. 8 is a flow chart illustrating a method for determining quality of a sound signal and requesting sound signal re-output based on a result of the determination, during a fault diagnosis by a diagnostic server of a service center according to an embodiment of the present invention.

Referring to FIG. 8, upon receiving a fault diagnosis request from the user, the diagnostic server of the service center 200 performs a fault diagnosis of the home appliance 101 in response to a diagnosis command input through the input device 280.

As a sound signal output from the home appliance 101 is received through the portable terminal 80, the server controller 210 stores the received sound signal (S450).

The server controller 210 applies the received sound signal to the signal processor 230, which then extracts product information from the received sound signal through signal conversion and decoding for the received sound signal (S460 and S470). At this time, in the case where it is determined that an error has occurred during the signal conversion and analysis or the fault diagnosis cannot be performed based on the product information, due to an error in the received sound signal (S480), the server controller 210 requests the user of sound signal re-output or re-transmission through the portable terminal 80 connected thereto (S490).

Also, the server controller 210 may determine a call quality of a communication network connected with the portable terminal 80 with respect to the received sound signal, as well as an error in the sound signal itself, to determine whether the received sound signal is readable, before the signal conversion and decoding are performed by the signal processor 230. As a result, in the case where the call quality is determined to be so low that the received sound signal is not readable, the server controller 210 may also request the user of sound signal re-output through the portable terminal 80 connected thereto, as stated above.

When a sound signal is re-output from the home appliance 101 and received by the service center 200 through the portable terminal 80 after a certain time elapses from the sound signal re-transmission or re-output request (S500), the server controller 210 stores the received sound signal and controls the above steps S450 to S480 such that they are repeated. Also, in the case where an error is present in the second output sound signal or the fault diagnosis cannot be performed based on the second output sound signal, the server controller 210 again requests the sound signal re-transmission or re-output (S490).

The server controller 210 determines the call quality or signal quality based on at least one of a signal level, a noise level and a symbol time length and determines whether the sound signal is recognizable or the fault diagnosis can be performed, according to the determined call quality or signal quality.

When the home appliance 101 outputs a sound signal including product information a second time or a third time, the server controller 210 applies information about a changed symbol time or frequency of the output sound signal to the signal processor 230 such that the signal conversion and decoding for the received sound signal are performed based on the information.

Here, the server controller 210 may derive the changed symbol time or frequency information from information included in the received sound signal or receive it separately from the received sound signal. Also, according to an agreement with the home appliance 101, the server controller 210 may allow signal processing for the received sound signal to be performed based on symbol time or frequency change data associated with the sound signal re-output.

In the case where the received sound signal is normal, the server controller 210 applies the product information to the diagnoser 260 such that the diagnoser 260 performs the fault diagnosis. The diagnoser 260 executes a diagnosis program to classify data of the product information according to a predetermined criterion, analyze the classified data and determine the state of the home appliance 101 based on a result of the analysis, so as to determine whether the home appliance is out of order. Also, the diagnoser 260 analyzes the cause of the fault of the home appliance to derive a countermeasure against the fault, and then applies a result of the diagnosis to the server controller 210.

The server controller 210 outputs the diagnosis result of the diagnoser 260 to the output device 270 (S530). According to the diagnosis result, the server controller 210 dispatches a service technician to a location at which the home appliance 101 is installed, and transmits the diagnosis result to a terminal of the service technician (S540).

Figure 9:
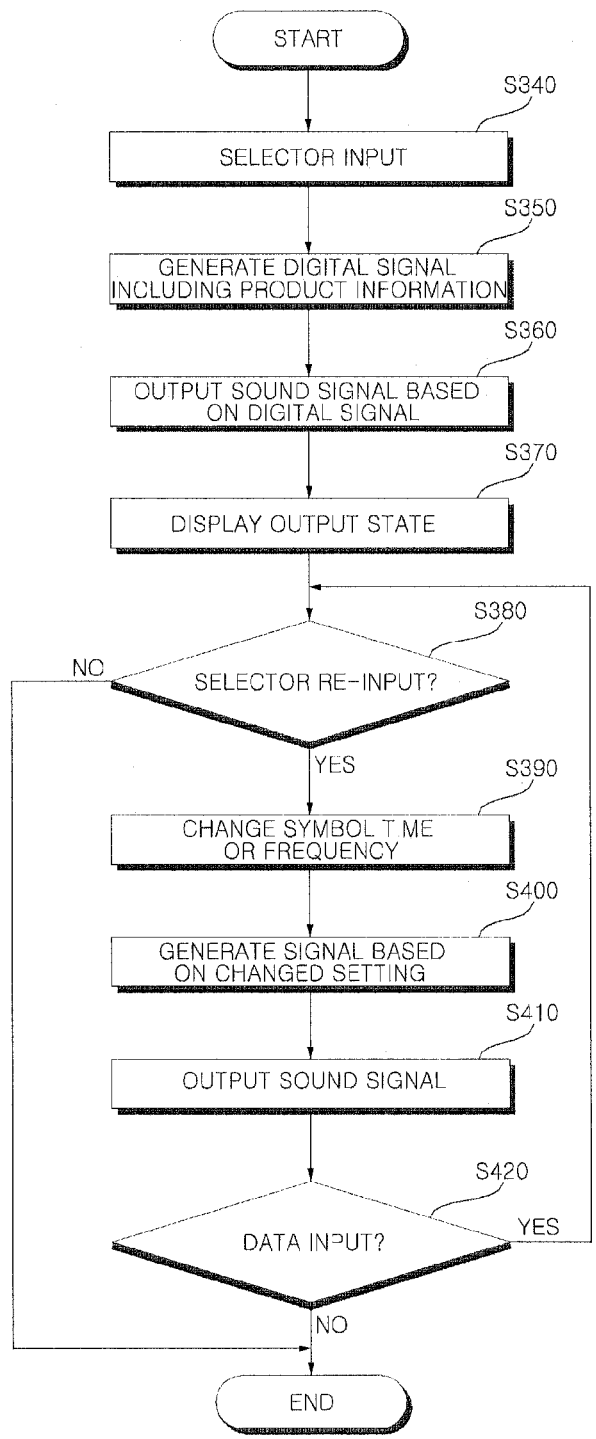
FIG. 9 is a flow chart illustrating a signal re-output method of a home appliance according to an embodiment of the present invention.

FIG. 9 is a flow chart illustrating a signal re-output method of a home appliance according to an embodiment of the present invention.

Referring to FIG. 9, upon entering a smart diagnosis mode in response to an input of the selector 130 (S340), the home appliance 101 encodes product information and generates the encoded product information in the form of a digital signal of a predetermined format (S350). When the smart diagnosis mode is started, the home appliance 101 displays the state and progress of the smart diagnosis mode on the display device 118 in the form of at least one of text, a numeral and an image. The encoder 142 adds a product number and version information to the product information and divides the resulting product information by a predetermined size to generate a plurality of frames. Here, each frame consists of a header, and a payload including divided data of the product information. The header and the payload are separately encoded to constitute a frame. A preamble is added to each frame, and an IFS is set between frames.

The framed product information is applied as a digital signal to the modulator 150, which then outputs a signal of a frequency corresponding to a data value of the digital signal through the sound output device 160 for a specified symbol time. As a result, the sound output device 160 outputs a predetermined sound signal including the product information (S360).

At this time, the display device 118 displays the output state of the sound signal in the form of at least one of text, a numeral and an image (S370). Also, the home appliance 101 may output predetermined effect sounds indicating the start of the smart diagnosis mode and the start and end of the sound signal output.

When the output of the sound signal is ended, the home appliance 101 displays that the output of the sound signal has been ended. When the selector 130 is re-input (S380), the controller 140 determines that the selector 130 has been re-input after the output of the sound signal including the product information, and thus changes the symbol time or frequency for sound signal re-output (S390).

The modulator 150 changes the digital signal to a signal of a specific frequency in response to a changed setting (S400). In this case, the modulator 150 outputs a signal of a frequency corresponding to a data value of the digital signal through the sound output device 160 for the changed symbol time. Also, in the case where the frequency is changed, the modulator 150 changes an oscillation frequency and outputs a signal of the changed frequency corresponding to a data value of the digital signal through the sound output device 160.

Consequently, the sound output device 160 outputs a sound signal different from the first output sound signal a second time (S410).

The second output sound signal has a changed version of the symbol time or frequency of the first output sound signal. In the case of the symbol time change, the length of the second output sound signal may be different from that of the first output sound signal. As needed, the modulator 150 may change both the symbol time and frequency.

When data is input by the selector 130 or manipulator 117 (S420), the controller 140 again determines whether the input data is data input by the selector 130 (S380). In the case of the data input by the selector 130, the controller 140 repeats the above steps S390 to S420 to output a sound signal having a symbol time or frequency different from those of the first and second output sound signals a third time.

For any other input than the input by the selector 130, the controller 140 ends the fault diagnosis process based on the smart diagnosis mode.

Therefore, the diagnostic server of the service center 200 performs the fault diagnosis of the home appliance 101 by receiving and analyzing the second output sound signal, and requests a third output when the second output sound signal is also not recognizable or the fault diagnosis is also impossible based on the second output sound signal. When sound signals have been output a predetermined number of times or more, the diagnostic server notifies the user of the home appliance 101 through the portable terminal that the fault diagnosis is impossible.

Accordingly, according to the present invention, home appliance outputs product information in the form of a sound signal, and a service center recognizes the sound signal, extracts the product information from the sound signal and performs a fault diagnosis of the home appliance based on the extracted product information to diagnose the state of the home appliance. When the service center cannot recognize the sound signal or perform the fault diagnosis, due to an error in a process of the home appliance outputting the sound signal or an error in a communication network itself, the home appliance changes a symbol time or frequency, thereby improving a sound recognition rate of the service center.

As is apparent from the above description, in a home appliance diagnostic system and method according to the present invention, when a service center receiving a sound signal output from a home appliance requests the home appliance of sound signal re-output due to an impossible fault diagnosis of the home appliance, the home appliance outputs a sound signal having a changed frequency or symbol time. Therefore, it is possible to improve a sound recognition rate of the service center, so as to prevent an erroneous diagnosis, thereby improving efficiency and accuracy of the fault diagnosis.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home appliance, comprising:
 a selector to receive a command for execution of a fault diagnosis;
 a memory that stores product information of the home appliance for the fault diagnosis;
 a main controller that, upon receipt of the command through the selector, implements a mode for diagnosing the home appliance;
 an encoder that, while the mode for diagnosing is being implemented, defines a symbol time and frequencies constituting frequency signals, and encodes the product information to generate a digital signal consisting of symbols which constitute the product information;
 a modulator that converts the symbols into frequency signals according to the digital signal, each of the frequency signals having any one of defined frequencies which are different from each other, each of the defined frequencies being associated with one of the symbols having different data values from each other, each of the frequency signals having an output duration of the symbol time; and
 a sound output device that outputs sound signals according to the frequency signals, wherein each of the sound signals has a frequency corresponding to one of the frequency signals and is output for the symbol time, wherein the main controller, when the command is re-input through the selector, controls the encoder to execute at least one of increasing the symbol time or changing at least one of the frequencies constituting the frequency signals.

2. The home appliance according to claim 1, wherein, when the symbol time is increased, the modulator converts the symbols into frequency signals based on the increased symbol time, and the sound output device outputs each of the sound signals for the increased symbol time.

3. The home appliance according to claim 1, wherein, when the at least one of the frequencies is changed, the modulator converts the symbols into the frequency signals based on the at least one of the frequencies changed, and the sound output device outputs sound signals according to the at least one of the frequencies changed.

4. The home appliance according to claim 1, wherein the selector is configured to receive input of the command from a user.

5. A method for operating a home appliance, the method comprising:
- controlling an encoder to generate a digital signal consisting of symbols which constitute product information;
- controlling a modulator to convert the symbols into frequency signals according to the digital signal, wherein each of the frequency signals has one of predetermined frequencies which are different from each other, each of the predetermined frequencies is associated with one of the symbols having different data values from each other, and each of the frequency signals has an output duration of a predetermined symbol time;
- controlling a sound output device to output sound signals according to the frequency signals, wherein each of the sound signals has a frequency corresponding to one of the frequency signals and is output for the symbol time;
- receiving a command for re-outputting sound signals through a selector; and
- controlling the encoder to execute at least one of increasing the symbol time or changing at least one of the frequencies constituting the frequency signals.

6. The method according to claim 5, further comprising:
- controlling the modulator to convert the symbols into frequency signals based on the increased symbol time; and
- controlling the sound output device to output each of the sound signals for the increased symbol time.

7. The method according to claim 5, further comprising:
- controlling the modulator to convert the symbols into the frequency signals based on the at least one of the frequencies changed; and
- controlling the sound output device to output sound signals according to the at least one of the frequencies changed.

* * * * *